H. R. LAKIN.
WHEEL CHOCK FOR HAND TRUCKS.
APPLICATION FILED MAY 12, 1921.
1,411,790.
Patented Apr. 4, 1922.
2 SHEETS—SHEET 1.
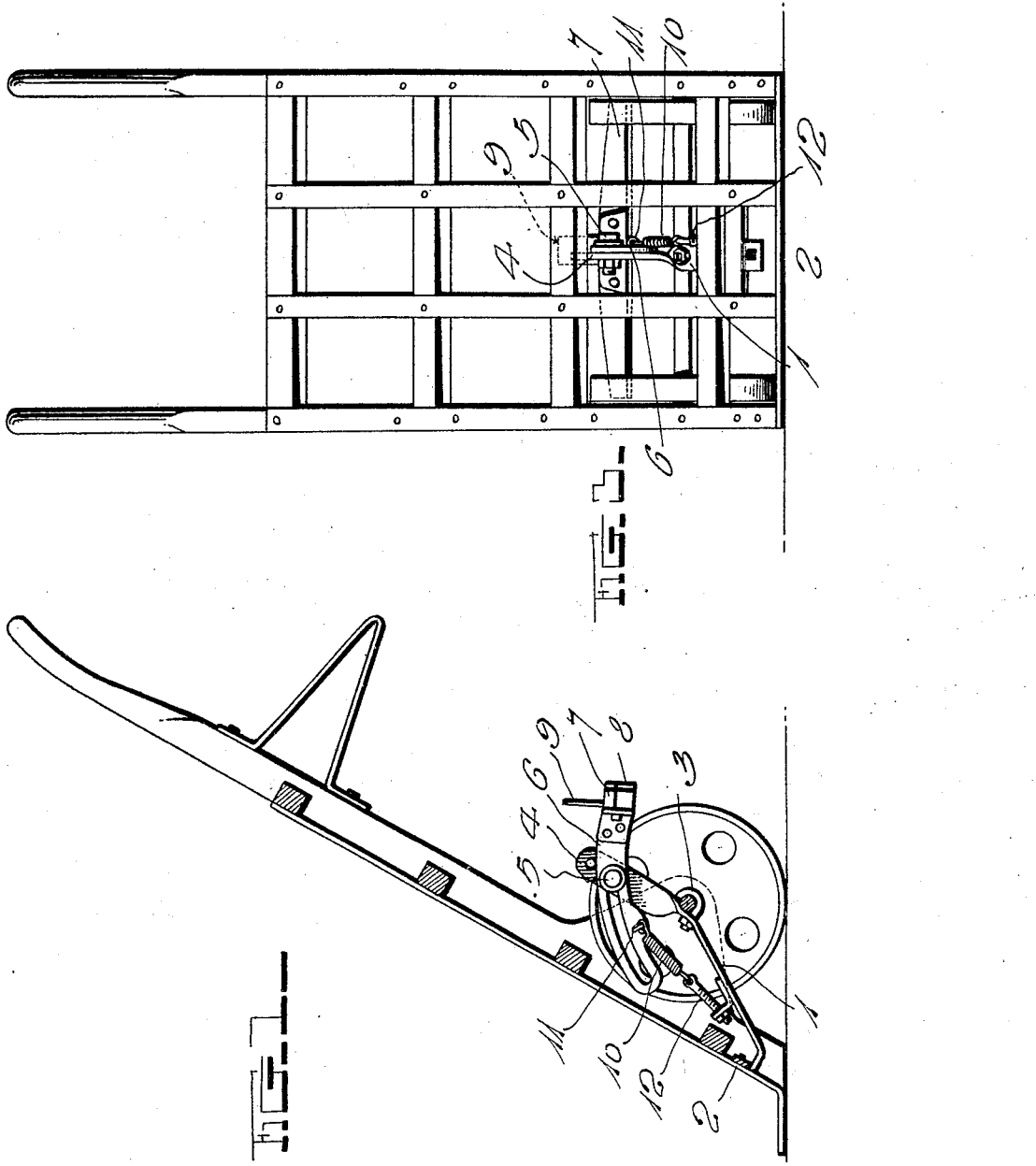
Inventor
H. R. Lakin
Witness
H. Woodard
By H. B. Wilson &co
Attorneys

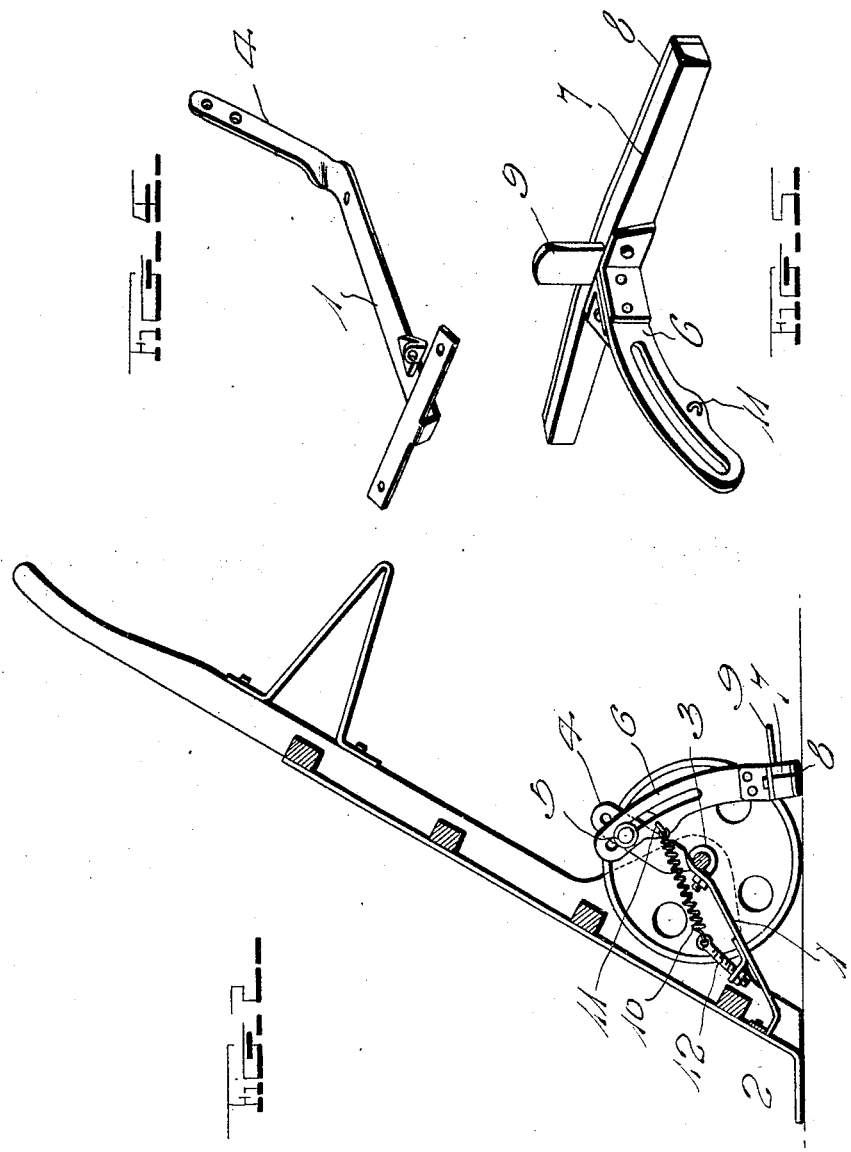

UNITED STATES PATENT OFFICE.

HARRY RAY LAKIN, OF ANDERSON, INDIANA, ASSIGNOR TO THE PIERCE GOVERNOR COMPANY, OF ANDERSON, INDIANA, A CORPORATION.

WHEEL CHOCK FOR HAND TRUCKS.

1,411,790.       Specification of Letters Patent.       Patented Apr. 4, 1922.

Application filed May 12, 1921. Serial No. 468,302.

*To all whom it may concern:*

Be it known that I, HARRY R. LAKIN, a citizen of the United States, residing at Anderson, in the county of Madison and State of Indiana, have invented certain new and useful Improvements in Wheel Chocks for Hand Trucks; and I do declare the following to be a full, clear, and exact description of the invention, such as will enable others skilled in the art to which it appertains to make and use the same.

This invention relates to an improved wheel chock which is especially, although not necessarily, designed for use on hand trucks such as are used for transporting baggage and other heavy articles in warehouses, the invention having for its object to provide a novel device of this class which will support the truck in an inclined or loading position and effectively hold it against excessive forward or rearward movement, thus enabling a single person to load the truck with ease.

Another object of the invention is to generally improve upon devices of this class by the provision of one of extreme simplicity and durability which can be applied on conventional types of hand trucks now in use without requiring any alterations of the latter, the number of parts being few and simple and the entire device being thus rendered very inexpensive to both the manufacturer and user, yet being such in construction that it very conveniently accomplishes the ends sought.

Another object of the invention is to provide a device of this class which is such in construction that it becomes automatically released when the truck is lowered to its horizontal pulling or pushing position, thus obviating the necessity of lowering the truck and supporting it on its legs while the chock block is removed as is the common practice. This is advantageous in that it overcomes the necessity of lowering the truck in this manner and then picking it up again and placing the operator under additional and unnecessary strain. With my device it is unnecessary to lower the device beyond its pulling position.

Other objects and advantages of the invention will be apparent during the course of the following description.

In the accompanying drawings, forming a part of this specification and in which like numerals are employed to designate like parts throughout the same:

Figure 1 is a central vertical sectional view through a conventional type of truck equipped with a wheel chock constructed in accordance with this invention, said chock being shown in inoperative position.

Figure 2 is a view like Fig. 1 but disclosing the chock in its operative position.

Figure 3 is a front elevational view of the truck and chock.

Figures 4 and 5 are perspective views of details of the device detached.

In carrying out the invention, I make use of a bracket 1 which is rigidly secured at its forward end as indicated at 2 with the body of the truck in any suitable fashion, being secured intermediate its ends by means of a hook-bolt 3 to the axle of the truck intermediate the ends of said axle. The free end of this bracket is upturned or directed upwardly as indicated at 4 and this end carries a combined connecting and pivot pin 5 which serves a purpose to be hereinafter described. Here, it may be pointed out that the free laterally directed end of the bracket may be formed with a series of openings in which this connecting pin may be inserted for changing the position of said pin and in turn changing the position of the parts of the device which co-act with this pin. A slotted arm 6, preferably arcuate in shape has slidable and pivotal connection with this connecting pin 5 and this arm is connected at its lower end in any suitable way with a cross-piece 7 which constitutes what may well be termed a wheel chock. It is to be noted that this chock is connected at its center to the arm and is of sufficient length to extend beneath both wheels of the truck. If desired, the lower face of this chock may be equipped with a rubber strip or other anti-slipping means 8. Also, the chock may carry, if desired, a foot-piece 9 for effectively operating the device.

In order to hold the chock in operative position and to return it to its normal inoperative position and hold it in such position, I make use of a coiled spring 10 which is connected at 11 to the intermediate portion of the arm 6, being connected at its oposite end to an adjusting device 12 carried by the aforesaid bracket 1. This adjusting device may be of any suitable construction and therefore need not be described specifically.

In use, the truck is wheeled up close to the object to be transported and the lifting bar, that is the projecting end of the metallic frame thereof, is placed beneath the object in the usual way. Then the operator places his foot on the foot-piece 9 and presses downwardly. In so doing, the chock 7 is moved downwardly beneath the wheels of the truck as indicated in Fig. 2 thus positioning the inner end of the coiled spring 10 below the connecting and pivot pin 5. In this position, the spring exerts a pull on the arm 6 which serves to retain the latter in the position to which it has been moved. With the truck in this inclined loading position, the object can be easily and readily placed thereon and the handle can be gripped and the truck lowered to pulling or pushing position. As soon as it assumes such position, the arm 6 is slid upwardly and when the inner end of the coiled spring is brought approximately opposite the connecting pin 5, the spring exerts a pull upon the arm 6 so that the latter is drawn inwardly beneath the truck to the inoperative position disclosed in Fig. 1. Hence, it will be seen that a single person can easily load and unload trucks which are equipped with wheel chocks constructed as herein shown and described.

A careful consideration of the detailed description taken in connection with the accompanying drawings will be found sufficient to enable persons skilled in the art to which the invention relates to obtain a clear understanding of the same. In view of this, a more lengthy and detailed description is deemed unnecessary.

Slight minor changes in the shape and size coming within the scope of the subjoined claims may be resorted to as is understood.

I claim:

1. A truck wheel chock comprising a bracket secured on the axle of the truck, a wheel chock having slidable and pivotal connection with said bracket, and a spring for holding the chock in operative position and for automatically returning it to inoperative position.

2. The combination with a hand truck; of a bracket connected intermediate its ends to the center of the truck axle, being rigidly connected at its forward end to the body of the truck, its opposite end being directed laterally upward and carrying pivot and carrying means, a slotted arm having slidable and pivotal connection with the latter, a transversely disposed wheel chock connected intermediate its ends with the lower end of said arm, and a spring connected at one end to the intermediate portion of the arm and at its opposite end to said bracket.

In testimony whereof I have hereunto set my hand.

HARRY RAY LAKIN.